United States Patent [19]

Kolb

[11] 4,165,995

[45] Aug. 28, 1979

[54] PLUG CONNECTION BETWEEN A THERMO FEELER AND A HOLDER

[75] Inventor: Gustav Kolb, Im Ohl 52, 5870 Hemer, Fed. Rep. of Germany

[73] Assignees: Mannesmann A.G.; Gustav Kolb, both of Dusseldorf, Fed. Rep. of Germany

[21] Appl. No.: 877,487

[22] Filed: Feb. 13, 1978

[30] Foreign Application Priority Data

Feb. 14, 1977 [DE] Fed. Rep. of Germany ....... 2706326

[51] Int. Cl.² ............................................. H01L 35/06
[52] U.S. Cl. .................................. 136/234; 136/235; 339/176 T
[58] Field of Search .............................. 136/234, 235; 339/176 T, 182

[56] References Cited

U.S. PATENT DOCUMENTS

| 3,048,642 | 8/1962 | Parker, Jr. ........................... | 136/235 |
| 3,246,520 | 4/1966 | Gaskill et al. ........................ | 136/235 |
| 3,427,208 | 2/1969 | Lowdermilk ......................... | 136/235 |
| 3,493,439 | 2/1970 | Boyle .................................... | 136/234 |

FOREIGN PATENT DOCUMENTS

| 1025027 | 4/1966 | United Kingdom .................... | 136/235 |
| 1084283 | 9/1967 | United Kingdom ................. | 339/61 R |

Primary Examiner—Neil Abrams
Attorney, Agent, or Firm—Ralf H. Siegemund

[57] ABSTRACT

The connection involves particularly the ends of the leads of thermocouples which are run so that they may engage directly contacts on a socket at the end of a holder. One such lead ends hangs into a central bore of a contact carrier to make contact with a central socket pin. The other or others of the lead ends engage a contact, or contacts in different axial level, and hang out of the contact carrier in the appropriate positions explained in great detail.

10 Claims, 7 Drawing Figures

PLUG CONNECTION BETWEEN A THERMO FEELER AND A HOLDER

BACKGROUND OF THE INVENTION

The present invention relates to a plug type connection between a thermo feeler and its holder, to be used, for example, for temperature sampling molten steel.

The temperature of molten steel, particularly in the interior of the steel bath, is usually measured by means of a so-called "lost" thermo feeler which in some fashion is fastened to a holder. The fastening should permit that a reliable connection between the components can be made easily and quickly. It is known here to provide the end of the tubular holder with a contact pin and a concentric tubular contact constituting a socket. The thermo feeler has a cylindrical contact carrier made of electrically insulating material and to be plugged into the socket for contact making of and between the respective contacts.

The thermo feeler is usually constructed as thermocouple made from Pt - PtRh wires, having a diameter smaller than 0.2 mm, even smaller than 0.1 mm. These wires or leads have no resiliency and little strength. Thus, they appear not to be suitable directly for contact making, and one has to provide particular contacts for constructing the above-mentioned plug type connection. The contact material, however, cannot be selected in accordance with properties most favorable with regard to contact making and resiliency. Rather, one must consider also the fact that these contacts must be thermoelectrically compatible with the thermocouple leads (see, for example, U.S. Pat. No. 2,823,364). The conductors which run down in the holder, must likewise be compatible with the thermocouple leads. It must be avoided that intermediate contact points and connections become thermoelectrically active in an unforeseen manner. It has, therefore, been suggested to use correspondingly compatible conductors between the thermocouple wires and the contact surfaces proper of the thermo feeler carrier, and all these conductors and contacts are compatible thermoelectrically with the thermocouple (see German printed patent application No. 1,423,936). The problem here is that conductors in the thermo feeler must be electrically connected with the thermo feeler contacts, and the thermocouple leads. The particular configuration of these contacts render the contact making and the establishing of the connection rather cumbersome, including particularly here an insulating support with grooves, etc.

DESCRIPTION OF THE INVENTION

It is an object of the present invention to provide a new and improved plug connection between a thermo feeler and a holder for the feeler.

It is a particular object of the present invention to provide a new and improved connection of the thermocouple leads of a thermo feeler, to the conductors running in a holder for such a feeler.

It is another object of the invention to provide a new and improved connection between the wires of a thermocouple, being less than 0.2 mm thick, and other conductors in a plug-in type configuration.

It is a further object of the present invention to provide for an electrical and a mechanical connection between a multi lead thermo feeler and a holder for the feeler including multiple (more than two) conductors in the holder to be connected to the leads as the feeler is mechanically fastened to the holder.

In accordance with the preferred embodiment of the invention, it is suggested to mount a socket member to a holder, the socket member has a central pin and one or more contacts on its inner periphery. The thermo feeler includes a contact carrier having a central bore and additional bores or slots strung through by the leads of thermocouples and having ends, one of which being hung into the central bore to engage the socket pin when inserted and the others hang down along the periphery of the contact carrier to engage the inner peripheral contacts in the socket. The contact carrier has ribs with radial outer dimensions exceeding slightly the inner dimensions of the socket plus inner contact assembly, and each of the leads (except the central one) hangs over at least one of the ribs. Thus, the thermocouple leads make direct contact with the socket contacts, the latter being connected to the conductors which run through the holder tube. These contacts and conductors are compatible thermoelectrically with the leads of the thermocouple to avoid setting up of parasitic thermosensitive points.

The contact carrier may be constructed to cause, so to speak, the ends of the leads to be suspended in different axial levels, and around the periphery to make contact with different contact rings in the socket. For n thermocouples, one has $2n-1$, such rings and levels, and $2n$ bores, ducts, slots, channels or the like are needed for stringing the thermocouple leads insulatedly from each other through the contact carrier. The portion of each lead that hangs at the periphery of the contact carrier covers only one level to make contact with one ring only upon insertion of the carrier into the socket.

The contact carrier may have a flange to be received by the thermocouple carrier or the contact carrier may have friction ribs to be inserted in the thermocouple carrier. The latter has the thermocouple leads embedded in parts. The hot point of a single thermocouple may be provided in the tip of a ceramic body being inserted in the thermocouple carrier. Alternatively, one or more U-shaped quartz tubes containing the hot points of different thermocouples may extend from the thermocouple carrier.

As stated, the contact carrier may be traversed in axial direction by plural bores, at least two of them (or both of them, if there are only two), end in a face of the carrier which will face the socket bottom. If there are more than one thermocouples, additional bores end in lateral exits in different levels away from the just mentioned end face. In lieu of bore one may provide pairs of two intersecting slots which facilitates threading of the leads into the contact carrier.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a tubular holder 1 with an open end for holding and receiving a thermo feeler 2. These two parts are to be interconnected electrically as well as mechanically.

Figure 1:
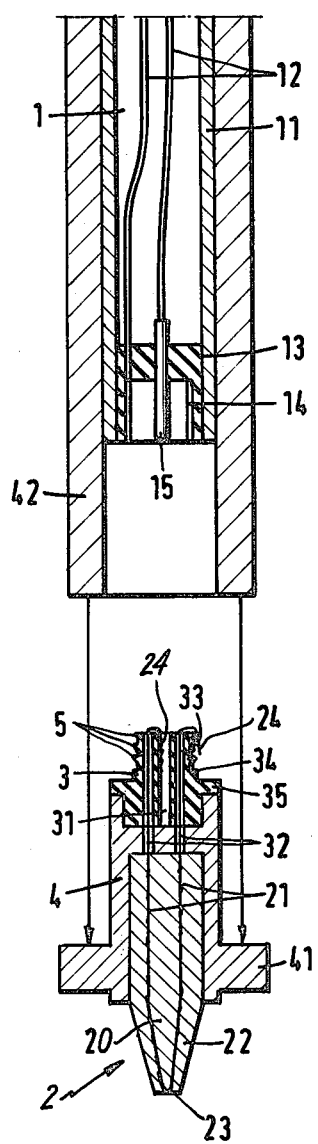
FIG. 1 is an exploded view of a cross-section through the end of a holder and of a thermo feeler showing particularly improved connection features between them.

Holder 1 is comprised of an inner tube 11 which is inserted in a paper or cardboard tube 42, the latter projects axially beyond the end of tube 11. Insulated conductors 12 run through tube 11. These conductors lead up and to a measuring instrument (not shown). The lower end of tube 11 receives a socket sleeve 13 made of electrically insulating material and carrying a contact making sleeve or tubular contact 14, as well as a central contact pin 15. Contact 14 is electrically insulated from tube 11 and from pin 15. Sleeve or socket 13 actually has a blind bore establishing the socket opening, and pin 15 projects from the bottom of that socket into that blind bore. The conductors 12 are electrically connected to contacts 14, 15 in a conventional manner.

The conductors 12, the contact 14 and pin 15, all are thermoelectrically compatible with the thermocouple leads. Preferably, conductors 12, 14 and 15 are all made of the same material, for example copper or copper alloy.

Thermo feeler 2 has a body 20 terminating in a tip 22 and supporting the soldered hot point 23 of a thermocouple whose leads 21 are embedded in body 20. The positive branch or lead of this thermocouple consists preferably of a platinum-rhodium wire and the negative branch or lead is preferably made of platinum. The body 20 of feeler 2 consists of a ceramic material being refractory in nature and made of such a substance which does not discharge any contaminants during drying and annealing, nor during measuring the temperature of molten steel.

The body 20 of feeler 2 is in parts inserted in a ceramic thermocouple carrier 4 of sleeve-like configuration which carries a contact carrier 3 made of electrically insulating material. Carrier 3 is of overall cylindrical configuration, and one end can be inserted into socket 13 in tube 11 of the holder, particularly one end of carrier 3 can be received by contact tube 14. Carrier 3 has a particular blind bore 31 for insertion of the pin 15. Carrier 3 supports contacts which, upon insertion into socket 13, will engage contacts 14 and 15 of the holder. These contacts are established in the following manner.

Carrier 3 has two additional bores 21 extending alongside central bore 31 but traversing the carrier 3 completely. Each of these two bores 32 receives one of the two thermocouple leads 21. The ends 24 of these leads project beyond the axial end face of carrier opposite tip 22, and are bent off. One of these leads 21 is doubled back, and its end 24 hangs into central bore 31.

The end 24 of the other one of the two leads 21 is also bent back again but extended alongside the outer periphery 33 of carrier 3.

The outer periphery 33 of carrier 3 includes annular, radially outwardly tapered, lip-like or chamfered ribs 5. The outer diameter of the ribs 5 is a little larger than the inner diameter of contact tube 14, and the one lead end 24 hangs actually over the ribs. This way, adequate contact pressure is provided between that lead end 24 and contact 14 as the plug and carrier 3 is inserted into that tube 14. However, the ribs 5 are rather thin so that the lead does not wear when sandwiched between ribs 5 and tube 14, but adequate contact is still made between the lead and outer contact 14 when the thermo feeler 2, particularly carrier 3 thereof, is inserted into the holder end, particulalry contact tube 14 and socket 13 thereon.

The dimensions of bore 31 are rather closely matched to the diameter of pin 15. Thus, upon insertion as per the preceding paragraph, the lead of the pair 21, which extends into bore 31, is urged against pin 15 for contact making. The resiliency of the material of carrier 3 provides for the requisite contact pressure and undue squeezing of that lead end 24 in bore 31 is also avoided.

It can thus be seen that two conduction paths are established from the hot point 23 through the leads 21, their ends 24, contacts 14, 15, and the conductors 12 leading to the instrument above.

Reference numeral 34 refers to an annular bead or flange over which the one lead of the pair 21 does not extend, and that flange, bead or rib firmly engages tube 14 to provide for strong frictional engagement of the parts to be mechanically interconnected therewith.

As stated, contact carrier 3 and the body 20 of thermo feeler 2, are inserted into ceramic thermocouple carrier 4 from opposite ends. A flange 35 of carrier 3, being situated in about the axial middle portion of carrier 3, abuts the one end of sleeve 4. The part of carrier 3 inserted in sleeve 4 is bonded to the interior thereof. The interior dimensions of sleeve 4 match closely the exterior dimensions of the inserts to establish a tight fit.

Sleeve 4 is provided with an annular flange 41 whose outer diameter matches approximately the outer diameter of the cardboard or paper tube 42 of the holder 1. The inner diameter of tube 42 matches the outer diameter of sleeve and thermocouple carrier 4, so that the latter can be inserted into the former until flange or shoulder 41 abuts the axial end of tube 42. Concurrently, carrier 3 becomes inserted into tube 14 and to the extend flange 35 permits such insertion. However, upon assembly, one inserts first the carrier 3 into tube 14 to the full extent, i.e., until the end of tube 14 abuts flange 35, and thereafter tube 42 is slipped over tube 11 and over tube 4, until abutting flange 41. The tube 42 provides for a temporary protection upon insertion into the molten steel. Protection as well as thermo feeler well be lost thereafter.

Figure 2:
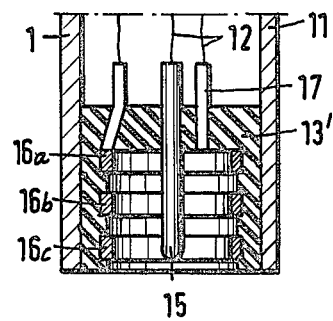
FIG. 2 is a similar exploded view on an enlarged scale but for two thermocouples.
Figure 3:
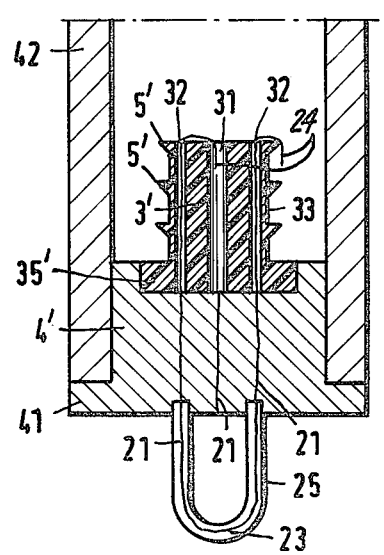
FIG. 3 is a section view through a portion of the connection shown in FIG. 2, and in a vertical plane at right angles to the plane of the drawing in FIG. 2.
Figure 3:
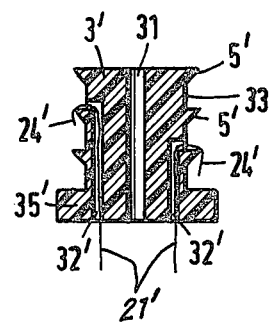
Figure 4:
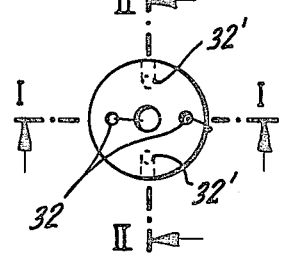
FIG. 4 is a view along lines 4—4 in FIG. 3, showing also respectively the section planes of FIGS. 2 and 3, identified by I—I and II—II.

FIGS. 2, 3 and 4 illustrate a thermo feeler with two thermocouples 21 and 21', i.e., four leads traverse a thermocouple carrier 4'; a separate body is not provided in this case. Also, the construction of carrier 3' is somewhat simplified. The holder 1 is established also here by a tube 11 being received by a cardboard or paper tube 42. Four conductors 12 and 12' (denoted in pairs) lead from an external instrument down in tube 11 and terminate in feed conductors or connecting pieces 17. The connecting pieces or prongs are received in a socket element 13' which receives three contact rings 16a, b, c, respectively, connected to the two conductors 12', and to one of the conductors 12. The other one of the conductors 12 has its contact 17 connected to the central socket pin 15. All these contacts 15a, 16a, b, c are electrically insulated from each other. The three conductors 17 leading to contacts 16a, b, c, are preferably symmetrically disposed on a circle around pin 15. Furthermore, they are preferably constructed analogously to a printed circuit and must bypass the rings to which they are not connected.

The thermoelectric properties of the conductors 12, of the contact rings 16a, b, c, and of the contact pin 15, match those properties of the thermocouples. Again, elements 15, 16a, b, c, and 12 and 12', are best made of the same material such as copper or copper alloy.

The thermocouples are established here by and in U-shaped quartz tubes 25 and 25', which are airtightly sealed and extend down from thermocouple carrier 4. Hot point 23 of couple 21 is located at the bottom of one U. The second hot point has been omitted for the sake of clarity. As stated, the thermocouple leads traverse the thermocouple carrier 4' which has a circular recess to receive a flange 35' of the insulating contact carrier 3'. The latter can be plugged into socket 13', as the bore 31 receives the pin 15.

Contact carrier 3' has four additional bores 32, 32' extending also axially, of which two (32) traverse carrier 3' while the two bores 32' are angled off and have radial extensions, i.e., lateral exits. These four bores receive, and are being strung or threaded through by leads 21, 12', whereby the ends 24 of leads 21 run through the bores 32 and are bent off just as in FIG. 1. The leads 21' project radially from the respective ends and exit of bores 32' as shown in FIG. 3 for establishing the contacts 24'. One can see that these lateral exits of the two bores 32' are in different levels with reference to the three ribs or ridges 5'. The length of the portions 24' and 24, extending along and adjacent to the periphery of carrier 33, are shorter than the spacing of contact rings 16a, b, c, from each other. Moreover, those lead ends which respectively hang over the three annular ridges 5' do not extend down enough to reach the respective ridge below. Thus, upon inserting carrier 3 into socket tube 13', each of the three thermocouple leads, which end at the periphery of carrier 3, make contact with one and only one of the annular contacts 16a, b, c. The contact making is a direct one and does not require additional surfaces. The fourth lead, of course, engages pin 15 in bore 31. Thus, the two thermocouples and particularly their hot points, are connected to the instrument at the other end of tube 1 in a four lead and four conductor connecting configuration.

The overall contour of the outer periphery of carrier 3', and the inner dimensions of socket 13, could be circular cylindrical. However, one may preferably have the socket opening provided with a conical flare, and carrier 3' will then be analogously tapered. This way, there will be little or no contact between parts upon inserting plug carrier 3' into socket 13' until just before the final position has been reached. Only then contact between three of the ends of leads 21, 21', and the rings 16a, b, c, will be made.

It can readily be seen that the number of contacts and leads can be increased further for accommodating more than two thermocouples, though there may be a practical limit based in parts on structural stability. Another modification can be made by chosing axially extending, azimuthally separated contact segments rather than the stack of rings 16a, b, c. However, in this case and particularly for a larger number of thermocouples, indexing and guide means are required to make sure that the right connections are made. The annular arrangement described above does not require a particular angular orientation of the parts 1 and 2 to each other when interconnected.

A two-thermocouple arrangement is used, e.g., if one of them is to determine the temperature of molten steel, while the other one is provided for undertaking the requisite temperature for determining the carbon content in steel.

Figure 7:
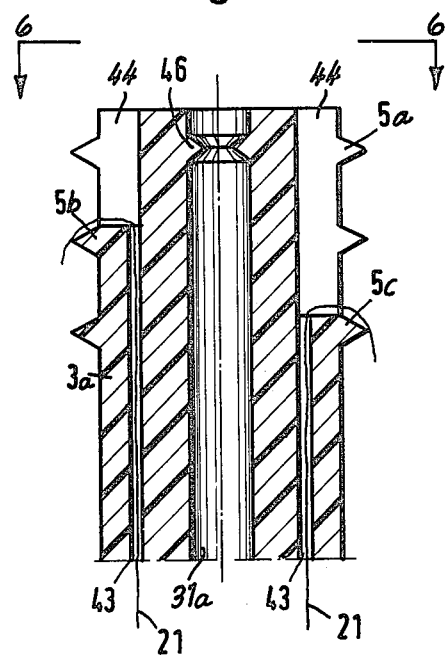
FIG. 7 is a section view taken along lines A—A in FIG. 6.
Figure 5:
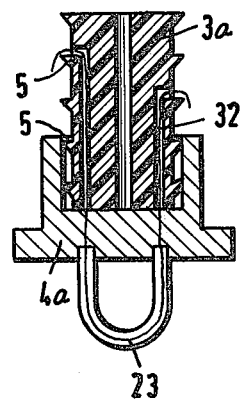
FIG. 5 is a view similar to FIG. 3, but showing a modified construction.
Figure 6:
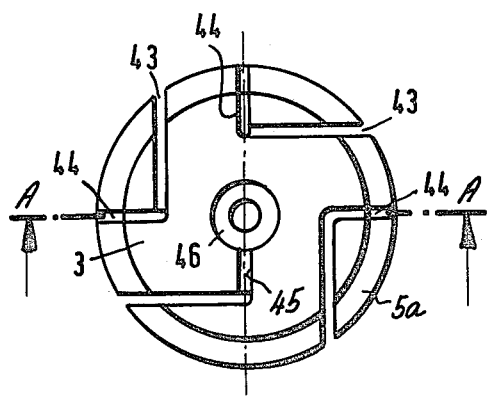
FIG. 6 is a front view of the particular thermo feeler plug shown in FIG. 5.

FIGS. 5, 6 and 7 illustrate, basically, a modification for the contact carrier, denoted here 3a. Carrier 3a is provided with ribs 5 over its entire axial extension. The thermocouple carrier 4a is constructed here to have a blind bore into which carrier 3a will be inserted, for a little less or thereabouts of its axial extension. The other end of contact carrier 3a will be inserted into the socket such as 13', as shown in FIG. 2. The ribs which will bend a little upon insertion positively position the carrier 3a in thermocouple carrier 4a.

FIGS. 6 and 7 show further features of this contact carrier 3a. The openings receiving all (but one) thermocouple leads each are established by pairs of slots. The slots of each pair extend at right angles to each other. For each lead, a slot 43 extends along a secant, but only for half a secant distance, and to a distance from the center about half an outer radius. These slots 43, moreover, extend only over a lower (axial) portion of carrier 3a. Each slot 43 meets a radial slot 44 at right angles and extends from above (axially), i.e., from the front end of carrier 3a which end will be inserted into the holder socket. Three of these end slots 44 extend from the outer periphery of carrier 3a. In the fourth instance, a half-a-secant slot 43 meets a slot 45 which does also extend radially, but from the central bore 31a.

One can also say that each of the lower slots 43 extend for half a secant from the periphery to a radial plane, where it meets a radial slot in that plane and extending either from the central bore (just in one instance) or from the periphery in 2n−1 instances where n is the number of thermocouples; U=2 in the example, which was chosen only for convenience.

The axial lengths of the several slots differ. One of the radial slots 44 extends only to a level above rib 5a, and is, therefore, quite short. The companion half-a-secant slot is long accordingly, almost reaching the socket side end face of contact carrier 3a. A second slot 44 extends to rib 5b and a third one extends to rib 5c. The half-a-secant slots 43 extend to whatever length is needed to intercept the respectively associated slot 44. It can thus be seen that running and threading the respective leads into these slots is greatly facilitated. Reference numeral 46 refers to a rib-like constriction of bore 31a to better receive and clamp the contact pin 15. The respective lead end from one of the thermocouples will hang down beyond the level of that constriction 46.

The invention is not limited to the embodiments described above but all changes and modifications thereof not constituting departures from the spirit and scope of the invention are intended to be included.

I claim:

1. A plug connection between a thermo feeler and a tubular holder for the feeler, there being a plurality of conductors in the holder, and a plurality of leads of and pertaining to the thermo feeler to be connected to the conductors of the plurality, comprising:

a socket member mounted to one end of the tubular holder and defining an opening;

contact means on the socket member including a central pin extending from a bottom of the member into the opening, and further including at least one contact at an inner periphery of the socket member;

the thermo feeler including a thermocouple carrier, said leads extending from the carrier;

an insulating contact carrier made of electrically insulating material and being mounted on the thermocouple carrier, having a central bore for receiving the pin, further having at least two additional passages extending axially in the contact carrier;

a plurality of annular ribs extending radially from the contact carrier and having radially tapered contour, a rib carrying portion of the contact carrier being insertible in the socket member, the ribs having slightly larger radial extension than the radial inner dimensions of the socket member including the one contact; and the leads being strung through the additional passages having their ends provided so that the end of one of the thermo feeler leads hangs into said pin receiving bore, and the other thermo feeler lead or leads, respectively, hang over the ribs to make contact with the contact means in the socket upon insertion of the contact carrier into the socket.

2. A plug connection as in claim 1, the contact means being constructed as a tube, the inner periphery thereof engaging said ribs, there being one thermocouple in the feeler, and two said additional passages.

3. A plug connection as in claim 1, the contact means being plural contacts in said socket, said passages being arranged to run said leads into the vicinity of the said contacts.

4. A plug connection as in claim 3, said plural contacts being plural rings in the socket, some of said passages having lateral exits so that said leads hang over different ribs in different axial levels to engage individual ones of the contact rings upon insertion of the contact carrier into the socket, the leads hanging out of the exits for less than an axial spacing between the rings.

5. A plug connection as in claim 4, the ribs being located adjacent said rings upon said inserting.

6. A plug connection as in claim 1, said contact carrier being partially inserted in said thermocouple carrier.

7. A plug connection as in claim 1, said contact carrier having additional annular ribs for frictional engagement of an opening in the thermocouple carrier in which the contact carrier is inserted.

8. A plug connection as in claim 1, said passages being narrow bores.

9. A plug connection as in claim 1, said passages each being comprised of two slots in the carrier, a first one extending radially from one end of the carrier facing said socket bottom upon insertion, the other slot of the two extending for half a secant distance and intercepting the respective first one.

10. A plug connection as in claim 1, said central bore having a constriction for engagement with the pin.

* * * * *